(12) United States Patent
Popp

(10) Patent No.: US 11,991,483 B2
(45) Date of Patent: May 21, 2024

(54) BACKGROUND DISPLAY DEVICE

(71) Applicant: Arnold & Richter Cine Technik GmbH & Co. Betriebs KG, Munich (DE)

(72) Inventor: Hermann Popp, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 0 days.

(21) Appl. No.: 17/963,371

(22) Filed: Oct. 11, 2022

(65) Prior Publication Data

US 2023/0109907 A1  Apr. 13, 2023

(30) Foreign Application Priority Data

Oct. 11, 2021 (DE) .......................... 102021126307.7

(51) Int. Cl.
| | | |
|---|---|---|
| G09G 3/00 | (2006.01) | |
| G09G 3/32 | (2016.01) | |
| H04N 5/222 | (2006.01) | |
| H04N 9/31 | (2006.01) | |
| G09F 9/33 | (2006.01) | |

(52) U.S. Cl.
CPC ......... *H04N 9/3185* (2013.01); *H04N 5/2224* (2013.01); *H04N 9/3182* (2013.01); *H04N 9/3194* (2013.01); *G09F 9/33* (2013.01)

(58) Field of Classification Search
None
See application file for complete search history.

(56) References Cited

U.S. PATENT DOCUMENTS

| 6,784,856 B2 * | 8/2004 | Berstis ..................... G09G 3/20 345/82 |
| 9,710,972 B2 | 7/2017 | Sanders et al. |
| 2002/0005862 A1 * | 1/2002 | Deering ................. G09G 5/363 345/694 |

(Continued)

FOREIGN PATENT DOCUMENTS

| WO | 2007087376 A1 | 8/2007 |
| WO | 2019241712 A1 | 12/2019 |
| WO | 2020097212 A1 | 5/2020 |

OTHER PUBLICATIONS

German Patent and Trademark Office Communication issued in Application No. 10 2021 126 307.7 dated, Oct. 11, 2021.

(Continued)

*Primary Examiner* — Sepehr Azari
(74) *Attorney, Agent, or Firm* — Amster, Rothstein & Ebenstein LLP

(57) ABSTRACT

A background display device for a virtual image recording studio that is configured to display, behind a real subject, a representation of a virtual background for a camera recording comprises at least one panel having a plurality of actively illuminating picture elements. The picture elements form a two-dimensional arrangement that extends along a first direction of extent and a second direction of extent oriented perpendicular thereto, wherein a respective spacing, measured along the second direction of extent, of the picture elements from a first reference line that extends rectilinearly along the first direction of extent varies irregularly along the first direction of extent.

19 Claims, 9 Drawing Sheets

(56) References Cited

U.S. PATENT DOCUMENTS

Figure 1:
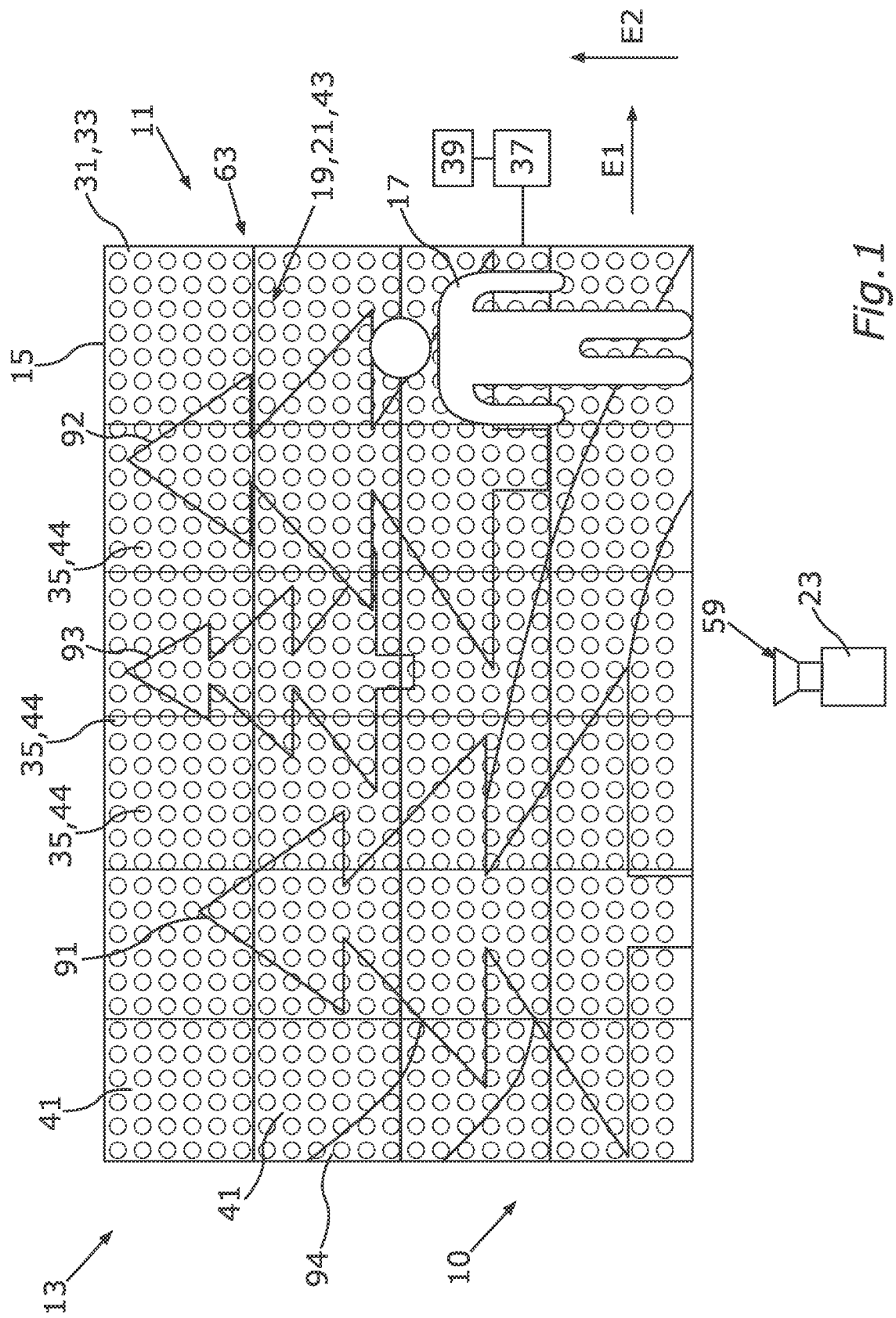

| | | | | |
|---|---|---|---|---|
| 2003/0206179 A1* | 11/2003 | Deering | ............... | H04N 9/3185 |
| | | | | 345/589 |
| 2007/0176854 A1* | 8/2007 | Ward | ....................... | G09F 19/22 |
| | | | | 345/44 |
| 2008/0198263 A1* | 8/2008 | Kiuchi | ............. | H04N 21/42202 |
| | | | | 348/E7.003 |
| 2014/0218345 A1* | 8/2014 | Matsuura | ............. | G09G 3/3426 |
| | | | | 345/207 |
| 2015/0348326 A1 | 12/2015 | Sanders et al. | | |
| 2015/0350628 A1 | 12/2015 | Sanders et al. | | |
| 2017/0221296 A1 | 8/2017 | Jain et al. | | |
| 2017/0294155 A1* | 10/2017 | Kim | ..................... | G09G 3/3266 |
| 2017/0301059 A1* | 10/2017 | Kitashou | ................ | G06T 5/006 |
| 2017/0338292 A1* | 11/2017 | Choi | .................... | H10K 59/352 |
| 2020/0105171 A1* | 4/2020 | Greenebaum | ......... | G06T 3/4069 |
| 2020/0145644 A1* | 5/2020 | Cordes | ................. | H04N 23/698 |
| 2020/0319341 A1 | 10/2020 | Ollila et al. | | |

OTHER PUBLICATIONS

Anonymous: "The DARK BAY Virtual Production Stage was built to provide film and television series productions with a", ARRI, Jun. 10, 2021, pp. 1-10, XP055974820, found in the internet: URL:https://www.arri.com/news-en/arri-supported-the-creation-of-the-dark-bay-virtual-production-stage.

European Patent Office Communication issued in Application No. 22200075.4, dated Mar. 14, 2023.

* cited by examiner

BACKGROUND DISPLAY DEVICE

The invention relates to a background display device for a virtual image recording studio that is configured to display, behind a real subject, a representation of a virtual background for a camera recording.

Such background display devices can in particular be provided to display in an image recording studio a landscape or an environment in which a recording is to be made by an associated camera and which forms a virtual background for a scene to be recorded. The image recording studio, for example, can be a film studio for recording moving image sequences or a photo studio in which individual images or still images are recorded. In general, such a recording can include local storage of image data or a transmission to a remote location (e.g. Broadcast, Streaming). In the virtual image recording studio, a virtual background or a virtual environment can thus be created in which an actor can move around during a moving image recording, or it can form a background for a still image recording. The virtual background mentioned in the present context therefore comprises image information that represents a background subject and whose representation can be directly recorded by an associated camera as an apparently real environment of a (foreground) scene. The representation of the virtual background "behind" a real subject is to be understood comprehensively in this context since the virtual environment can also be provided above or below the real subject.

For example, when recording moving images, a background display device can be used to display a representation of a virtual background to be able to record a scene directly in the intended environment. In particular, as a result of this, the acting can be facilitated since possible events occurring in the virtual background can be perceived by an actor and the actor can react to these events. In contrast to the use of a green screen for example where the environment is not visible to the actor, the actor can therefore adapt his acting to any background events and a director, a camera person or any other person involved in a shooting can already gain an overall impression of the scene during the shooting and can evaluate the scene. In addition, the entire scene or a corresponding section of a film can be viewed and checked directly after the recording, without the background provided for the scene also having to be superposed.

In the case of still image recordings, such a background display device can, for example, be used to record photographs in basically any surrounding in an image recording studio, and thus in a controllable environment, and to have the resulting image fully in view while taking the photograph. The background and the real subject or a person to be photographed can thus be optimally matched or coordinated with one another. In addition, the recorded photo can be viewed immediately, in order to carry out necessary adjustments if required.

To display the representation of the virtual background, background display devices can in particular form or have an electronic display, which has an active pixel matrix, and can, for example, comprise an active illumination apparatus having a plurality of actively illuminating picture elements (light-emitting elements). For example, to display a representation of a virtual background in a virtual image recording studio, an LED wall can be used whose light-emitting diodes can be controllable individually and/or in groups of adjacent light-emitting diodes or in arrays of light-emitting diodes. Light-emitting diodes of such an LED wall can, for example, be provided as LEDs (Light Emitting Diodes) or as OLEDs (Organic Light Emitting Diodes). Furthermore, the light-emitting diodes can be part of a liquid crystal display. Such background display devices can, for example, extend over a width of at least 5 m and a height of at least 2 m to be able to record several actors in front of a common (virtual) background.

Furthermore, background display devices can comprise a plurality of panels at which the picture elements are arranged and which together form the LED wall. While the panels can be substantially two-dimensional and the picture elements arranged at a panel can extend in a two-dimensional arrangement, it can, for example, be achieved by a suitable arrangement of a plurality of panels that the background display device is sectionally curved and/or arched. The background display device can thereby be arranged, for example, both behind and above or below the real subject in the virtual image recording studio in order also to enable the direct recording of a representation of a virtual sky, of a virtual ceiling of a room, or of a virtual floor in the image recording studio. Alternatively to an LED wall, a representation of a virtual background can generally also be generated by light spots that are produced by a reflection or a transmission at a light source wall, for example, a screen for a rear projection. For this purpose, the active light generation can take place by a projector, wherein the light sources are merely formed indirectly on the screen.

Such a background display device can in particular make it possible to visually present a virtual background, which can in particular represent a three-dimensional scene, by appropriately controlling the picture elements and/or to adapt said virtual background by changing the control during a recording. A background display device thus offers the possibility of representing a virtual background for a scene to be recorded in an animated and easily adaptable manner and thereby, in particular, of facilitating the acting or the gestures.

However, a problem when recording such a representation of a virtual background can arise from the fact that, when imaging the representation displayed by an active pixel matrix onto an image sensor of a camera that likewise has light-sensitive sensor elements arranged in a pixel matrix composed of a plurality of rows and a plurality of columns perpendicular thereto, large-area interference and cancellation effects can occur in regions in which the grids of the pixel matrix of the background display device and of the image sensor are superposed. These interference and cancellation effects can, on a subsequent display of the image created by the camera, have the result that recurring geometric patterns are recognizable in the displayed images that are not recognizable in the actually recorded scene or in the virtual image recording studio and that represent unwanted artifacts of the superposition of the two regular grids of the background display device and the image sensor. However, such artifacts, known for example as moiré effects or alias effects, can lead to the complete unusability of the recorded image material and can therefore possibly completely counteract the advantages to be achieved by a background display device.

It is therefore an object of the invention to provide a background display device for a virtual image recording studio that enables a direct camera recording of a representation of a virtual background in a virtual image recording studio without geometric patterns arising in an image of the representation of the virtual background due to interferences between a pixel matrix of the background display device and an image sensor of the imaging camera.

This object is satisfied by a background display device having the features of claim 1.

The background display device comprises at least one panel having a plurality of actively illuminating picture elements. The picture elements form (at least when viewed in projection) a two-dimensional arrangement that extends along a first direction of extent and a second direction of extent oriented perpendicular thereto, wherein a respective spacing, measured along the second direction of extent, of the picture elements from a first reference line that extends rectilinearly along the first direction of extent varies irregularly along the first direction of extent.

In conventional background display devices having actively illuminating picture elements, provision is usually made that the actively illuminating picture elements form a pixel matrix and are arranged along the panel in a regular and strictly orthogonal grid. In such background display devices, all the picture elements arranged behind one another along the first direction of extent or the second direction of extent are therefore arranged along a reference line that extends rectilinearly along the first direction of extent or the second direction of extent. In such background display devices, a first reference line can thus be placed through the arrangement of the picture elements and intersects picture elements arranged behind one another along the first direction of extent, with picture elements offset relative to the first reference line with respect to the second direction of extent having regular spacings from said first reference line that correspond to a grid dimension of the regular grid with respect to the second direction of extent. However, as explained in the introduction, this regular arrangement can lead to interference or cancellation effects when imaging the representation of the virtual background onto an image sensor of a camera whose light-sensitive sensor elements are likewise arranged in a regular orthogonal grid of a plurality of rows and columns.

To prevent the emergence of patterns due to a superposition of such regular grids of the pixel elements of the background display device and of the sensor elements of the image sensor of the camera, the actively illuminating pixel elements in the background display device disclosed herein are not strictly arranged in an orthogonal grid, but have an irregularly varying spacing along the first direction of extent from a first reference line extending rectilinearly along the first direction of extent. The picture elements can in particular be irregularly distributed around the first reference line. In this context, the first reference line can represent an imaginary line that extends rectilinearly along the first direction of extent over the panel or within the two-dimensional arrangement of the actively illuminating picture elements. The picture elements thus only form an irregular two-dimensional arrangement.

Since the spacing of the picture elements along the second direction of extent from the first reference line varies irregularly, the picture elements are in particular not arranged in a straight line behind one another along the first direction of extent, but picture elements arranged behind one another with respect to the first direction of extent can be arranged offset from one another with respect to the second direction of extent. In particular, no imaginary first reference line can thus be placeable through the two-dimensional arrangement of picture elements that intersects all the picture elements arranged behind one another along the first direction of extent. Furthermore, provision can be made that the first reference line can be guided through the two-dimensional arrangement at an arbitrary position with respect to the second direction of extent, wherein a respective spacing, measured along the second direction of extent, of the picture elements varies irregularly along the first direction of extent independently of the position of the first reference lines.

Due to the irregular variation of the spacing of the picture elements from the first reference line, this spacing in particular does not follow a pattern whose superposition with a regular arrangement of light-sensitive sensor elements of an image sensor of a camera can lead to the occurrence of artifacts in an image generated by the camera. Rather, with respect to a rectilinear arrangement behind one another along the first direction of extent, the picture elements are irregularly or statistically distributed with respect to the second direction of extent in order to avoid a regular superposition with the regular grid of the image sensor. For this purpose, in particular no recurring pattern can be included within the irregularly varying spacings of the picture elements from the first reference line. For this purpose, the picture elements can not only not be lined up in a straight line along the first direction of extent, but values of the measured spacings can form a completely irregular sequence that cannot be divided into a plurality of recurring cycles.

To reliably avoid the occurrence of artifacts in an image by a camera, the spacing of the picture elements from the first reference line can vary irregularly, in particular at least along a plurality of picture elements. Provision can also be made that the spacing from the first reference line varies irregularly along the entire panel so that, across the entire panel, the spacings from the first reference line cannot form a recurring pattern. In general, however, it can be sufficient if the spacings do not form a recurring pattern over a sufficiently long reference path along the first direction of extent that could lead to the occurrence of a perceivable artifact in an image generated by the camera.

Picture elements in the sense explained above are not necessarily to be understood as individual components of the background display device that possibly carry the light-emitting elements; such components can also be arranged in a regular matrix. In the present context, picture elements are rather to be understood as the light-emitting areal regions of the background display device that can be perceived by a user or that can be acquired by the camera as image information.

To display the representation of the virtual background, the background display device can further, for example, comprise a single panel that can in particular be positioned behind an actor or a person to be photographed for displaying the representation of the virtual background. However, the background display device can also comprise a plurality of panels that can be arranged adjoining one another so that a respective section of the representation of the virtual background can be displayed at each of the plurality of panels. Such panels of a background display device can in particular also be referred to as panels.

Further embodiments of the invention can be seen from the dependent claims, from the description and from the drawings.

In some embodiments, a respective spacing, measured along the second direction of extent, between the first reference line and picture elements adjacent to the first reference line can vary irregularly along the first direction of extent. For example, picture elements arranged behind one another along the second direction of extent can have a mean spacing from one another, wherein picture elements adjacent to the first reference line can have a spacing from the first reference line that is measured along the second direction of extent and that is less than the mean spacing of the picture elements from one another along the second direction of extent. If an imaginary first reference line is thus guided through the two-dimensional arrangement of the picture elements, picture elements adjacent to this reference line are not lined up along the reference line, but can have an irregularly varying spacing from the reference line. Picture elements that can be intersected by a first reference line in an arrangement in a regular grid can thus be statistically distributed around this first reference line in some embodiments.

In some embodiments, the background display device can be configured as an LED wall and the actively illuminating picture elements can be configured as light-emitting diodes or light-emitting diode units. The light-emitting diodes of such an LED wall can, for example, be configured as LEDs (Light Emitting Diodes) or as organic light-emitting diodes or OLEDs (Organic Light Emitting Diodes).

In the case of an LED wall, provision can in particular be made that the individual picture elements, which together generate the representation of the virtual background, are formed by individual light-emitting diodes. In such embodiments, the individual light-emitting diodes can have an irregularly varying spacing from a rectilinearly extending reference line to form an irregular two-dimensional arrangement. In some embodiments, the individual light-emitting diodes can be associated with a plurality of different colors, i.e. a plurality of types (e.g. three, four, five or six) of individual light-emitting diodes can be provided that have different predetermined emission spectra, wherein the light-emitting diodes of each of the plurality of different colors form an irregular two-dimensional arrangement. For example, the background display device can have a plurality of light-emitting diodes emitting red light that have an irregularly varying spacing (at least with respect to a panel of the background display device) from a rectilinearly extending reference line; the background display device can have a plurality of light-emitting diodes emitting green light that have an irregularly varying spacing from a rectilinearly extending reference line (the same or another reference line); and the background display device can have a plurality of light-emitting diodes emitting blue light that have an irregularly varying spacing from a rectilinearly extending reference line. In some embodiments, the individual light-emitting diodes can be arranged in groups, wherein each group comprises a light-emitting diode of each of the plurality of types (colors) in spatial proximity to one another, wherein the arrangement of the light-emitting diodes within the respective group is, however, not uniform, i.e. individual light-emitting diodes of the same type have an irregularly varying spacing from a rectilinearly extending reference line from group to group. Thus, the irregular two-dimensional arrangement of the picture elements (=individual light-emitting diodes) is at least hereby formed even if the groups (as a whole) form a regular two-dimensional arrangement.

In other embodiments, the individual picture elements can be formed by respective light-emitting diode units, wherein each light-emitting diode unit can in particular comprise a plurality of (e.g. two, three, four, five or six) light-emitting diodes. The plurality of light-emitting diodes of a light-emitting diode unit can in particular have different emission spectra and can optionally be equipped with a color mixer. Furthermore, in such a light-emitting diode unit, provision can be made that the individual light-emitting diodes of the light-emitting diode unit can be selectively controlled to produce a desired color of the picture element formed by the light-emitting diode unit. A light-emitting diode unit can in particular comprise a light-emitting diode emitting red light, a light-emitting diode emitting green light, and a light-emitting diode emitting blue light. In such embodiments, the (complete) light-emitting diode units can have an irregularly varying spacing from a rectilinearly extending reference line to form an irregular two-dimensional arrangement.

In some embodiments, provision can further be made that the picture elements can be individually controlled to generate the representation of the virtual background. By controlling the picture elements, a respective color and/or brightness of the picture element can in particular be settable to be able to set a section or a point of the representation of the virtual background that is displayed by the respective picture element to the intended color and/or brightness.

In some embodiments, the background display device can extend in a vertical and/or horizontal orientation, in particular with continuous or quasi-continuous transitions. For example, provision can be made that the background display device extends in a vertical orientation in a planar manner behind the real subject to display the representation of the virtual background behind the real subject. Alternatively or additionally, provision can, however, also be made that the background display device at least sectionally extends in a horizontal orientation so that the representation of the virtual background can also be displayed above the real subject, for example. Furthermore, the background display device can be configured to surround and to cover the real subject in order to enable as complete as possible a display of the virtual background over a large angular range. In a section in which the background display device transitions from a vertical orientation into a horizontal orientation, the background display device can also be arched and/or curved. In particular in an assembly of the background display device from a plurality of panels, the panels can be assembled to form different and, for example, vault-like geometries in order to provide a desired environment for a recording in the virtual image recording studio. Furthermore, in some embodiments, provision can be made that the background display device is sectionally arranged on a floor of the virtual image recording studio. In such sections, the background display device can also in particular extend in a horizontal orientation.

In some embodiments, the background display device can further be configured to illuminate the real subject. This background display device can in particular serve to illuminate the real subject in addition to other illumination of the virtual image recording studio. For example, it can thereby be achieved that the real subject casts a shadow to be expected when illumination sources, for example a street lamp, are included in the virtual background in that the illumination of the real subject to be expected from a real street lamp starts from the displayed representation of the street lamp of the virtual background. However, the background display device can also be configured to sectionally emit light for illuminating a scene and can so-to-say act as a spotlight, while the background display device can display the representation of the virtual background at other sections.

In some embodiments, the background display device can be configured to vary the representation of the virtual background in time during the recording. Events taking place in the virtual background can thereby in particular be displayed directly by the background display device during a camera recording so that, unlike, for example, in the case of a green screen recording, an actor can react to these events and can correspondingly adapt the acting thereto. Consequently, the background display device can in particular be configured to display a film sequence, which can be recorded directly by the camera, during the camera recording. A subsequent superposition of the recording of the camera with a provided background is thus no longer necessary.

In some embodiments, the first direction of extent can be oriented along the horizontal and, in some embodiments, the second direction of extent can be oriented along the vertical or inclined to the vertical. The second direction of extent can in particular be oriented along the vertical in a vertical orientation of the background display device, while an inclined orientation of the second direction of extent can be provided in the case of an inclined orientation of the at least one panel in order, for example, to be able to display the representation of the virtual background above the real subject or to be able to illuminate the real subject from above.

In some embodiments, the respective spacing of the picture elements from the first reference line can vary irregularly along a reference path, which amounts to at least 5 cm and/or comprises at least 20 picture elements, along the first direction of extent. Furthermore, in some embodiments, the spacing of the picture elements from the first reference line can vary irregularly over the total extent of the panel along the first direction of extent.

Due to an irregular variation of the spacings of the picture elements from the first reference line along a sufficiently long reference path, it can be achieved, at least with common camera settings and/or recording conditions, that no recurring and recognizable geometric patterns arise in the image generated by the camera due to a superposition of a regular pattern of the arrangement of the picture elements with the arrangement of the light-sensitive sensor elements of an image sensor of the camera. For example, the variation of the spacings of the picture elements from the first reference line can repeat along consecutive reference paths for this purpose or a pattern of spacings formed along the reference path can be repeated along the following reference path, for example, rotated by 180 degrees. Due to such repetitions of irregular patterns over sufficiently long reference paths, the control of the panel can in particular be facilitated in that information about the variation of the spacings of the picture elements from the first reference line along a reference path can be sufficient to determine all the spacings of the picture elements from the first reference line. Furthermore, the representation of the virtual background can thereby be displayed in a regular arrangement of picture elements viewed over a large area.

Alternatively thereto, the spacing of the picture elements from the first reference line can, however, also vary irregularly over the total extent of the panel so that the spacings of the picture elements from the first reference line cannot form a recurring pattern over the total extent of the panel. Such a large-area or complete variation of the arrangement of the picture elements with respect to the first reference line can reliably prevent a superposition with the arrangement of sensor elements of an image sensor and geometric patterns arising in an image of the representation of the virtual background.

In some embodiments, the spacings of the picture elements from the first reference line can further be normally distributed. The spacings of the picture elements from the first reference line can in particular be normally distributed with respect to the aforementioned reference path or with respect to the total extent of the panel along the first direction of extent. The picture elements can thus be statistically distributed with respect to the first reference line, and in particular around the first reference line, without the distribution following a regular pattern.

In some embodiments, the spacings of the picture elements from the first reference line cannot form a repeating pattern along the first direction of extent. The spacings of the picture elements from the first reference line in particular cannot form a repeating pattern along the first direction of extent with respect to the reference path or with respect to the total extent of the panel along the first direction of extent. Furthermore, values of spacings, measured along the first reference line, of the picture elements from the first reference line cannot include a recurring sequence of numbers and/or a recurring pair of values. This can apply to amounts of the spacings and/or to values that are assigned a positive or a negative sign in dependence on a location of the respective picture element relative to the first reference line.

In some embodiments, a respective spacing, measured along the first direction of extent, of the picture elements from a second reference line that extends rectilinearly along the second direction of extent can vary irregularly along the second direction of extent. The second reference line can in particular also correspond to an imaginary line extending along the second direction of extent over the panel. The spacings of the picture elements from the second reference line that are related to the first direction of extent can in particular vary irregularly along a plurality of picture elements and/or a respective spacing, measured along the first direction of extent, between the second reference line and picture elements adjacent to the second reference line can vary irregularly along the second direction of extent. Furthermore, the respective spacing of the picture elements from the second reference line can vary irregularly along a reference path, which amounts to at least 5 cm and/or comprises at least 20 picture elements, along the second direction of extent and/or the respective spacing can vary irregularly over the total extent of the panel along the second direction of extent.

Since a respective spacing of the picture elements from a first reference line and from a second reference line can vary irregularly, the arrangement of the picture elements can ultimately be two-dimensionally irregular compared to a regular orthogonal grid with respect to the first direction of extent and the second direction of extent. In this regard, the picture elements cannot form a regular pattern in any of the directions along which the light-sensitive sensor elements of an image sensor of a camera are conventionally regularly arranged and/or can be arranged in a regular grid whose superposition with the grid of the image sensor can lead to unwanted artifacts in an image of the background display device. The picture elements can thus in particular be statistically distributed in both dimensions with respect to a conventional arrangement of picture elements in a regular and strictly orthogonal grid.

In some embodiments, the spacings of the picture elements from the second reference line can be normally distributed. The picture elements can thus in particular be arranged statistically distributed with respect to and/or around the second reference line without the arrangement of the picture elements following a regular pattern.

In some embodiments, the panel can have a number of separate picture element units that corresponds to the plurality of picture elements, said separate picture element units forming a regular arrangement, wherein each picture element unit can have an eccentric light-emitting areal region that corresponds to a respective picture element, but that is eccentrically arranged with respect to a geometric center of the picture element unit. The orientation of the respective eccentric light-emitting areal region, in particular the angular orientation, can vary along the regular arrangement of picture element units.

For example, such picture element units can have a square, hexagonal or octagonal outline to be able to be arranged in a checkerboard-like and/or honeycomb-like regular arrangement at the panel. The picture element units can in particular be arranged in a regular grid, for example an orthogonal grid, wherein, however, due to an irregularly varying orientation of the picture element units, which can, for example, be arranged rotated with respect to one another in this regard, the respective light-emitting areal regions and correspondingly the picture elements can be arranged at an irregularly varying spacing from a reference line extending along the first direction of extent and/or along the second direction of extent. For example, such a reference line can be arranged between two respective picture element units so that edges of the picture element unit that are disposed inwardly with respect to the reference line can lie on the reference line, wherein the respective light-emitting areal regions can be arranged at varying spacings from the reference line due to the varying orientation of the picture element units. Alternatively or additionally, a spacing of the respective eccentric light-emitting surfaces with respect to the geometric center of the picture element unit can also vary to be able to arrange the picture elements at an irregularly varying spacing from the first reference line and/or a second reference line.

Such picture element units can further be mechanically connected to one another and/or to a carrier to form the panel of the background display device. Furthermore, there can be a technical signal connection between the plurality of picture element units to be able to control the respective picture elements of the picture element units and to display the representation of the virtual background.

As already explained above, the picture elements can in particular be configured as light-emitting diodes or as light-emitting diode units so that the picture element units can, for example, have a respective eccentrically arranged light-emitting diode. Furthermore, a plurality of light-emitting diodes that form a light-emitting diode unit can be eccentrically arranged at the picture element units, wherein the light-emitting diodes of a light-emitting diode unit can be eccentrically arranged at the picture element unit as a group of light-emitting diodes and can, for example, be jointly arranged in a corner section of a square picture element unit.

In some embodiments, the two-dimensional arrangement can be divisible by a plurality of first reference lines extending along the first direction of extent and arranged at a regular spacing from one another, wherein the regular spacing can correspond to a mean value of spacings which picture elements adjacent along the second direction of extent have from one another. Furthermore, each of the plurality of picture elements can be assigned to a respective first reference line to which the picture element is adjacent with respect to the second direction of extent, wherein a spacing between each of the plurality of first reference lines and the respective assigned picture elements can vary irregularly along the first direction of extent.

When a conventional regular grid is assumed at least along the first direction of extent, the two-dimensional arrangement of the picture elements can generally be divided by a plurality of first reference lines with a regular spacing from one another that—in a regular grid—corresponds to the regular spacing between two picture elements adjacent along the second direction of extent. In a regular grid, all the picture elements accordingly lie on such a first reference line if the first reference lines have a spacing from one another along the second direction of extent that corresponds to the spacing of the picture elements adjacent along the second direction of extent from one another.

However, in the embodiments explained above, no such grid of a plurality of parallel first reference lines can be formed such that all the picture elements lie on a first reference line or such that all the picture elements are intersected by the first reference lines. Rather, in these embodiments, the picture elements adjacent to a respective reference line, which lie on the first reference line in a regular arrangement, are arranged spaced apart from the first reference lines with respect to the second direction of extent, wherein the spacing between the first reference lines and the assigned picture elements varies irregularly along the first direction of extent. In such embodiments, at least along the first direction of extent, the picture elements can thus be statically distributed with respect to a regular grid so that the picture elements do not form a regular pattern viewed along the first direction of extent.

Furthermore, in some embodiments, a number of the plurality of first reference lines can correspond to a number of picture elements that are arranged behind one another along the second direction of extent in the two-dimensional arrangement. The picture elements arranged behind one another along the second direction of extent can generally be arranged offset and/or can be arranged statistically distributed with respect to the first direction of extent so that the picture elements arranged behind one another along the second direction of extent do not necessarily have to be lined up along a straight line.

A number of first reference lines can thus in particular be placeable over the two-dimensional arrangement of picture elements that corresponds to the number of first reference lines of a regular grid in conventional background display devices. However, no first reference lines of this number and of the expected regular spacing can be found in such embodiments so that all the picture elements lie on a respective reference line. Rather, the picture elements can be statistically distributed with respect to the expected regular grid at least with respect to the second direction of extent.

In some embodiments, provision can be made that a mean spacing between the picture elements and the respective assigned first reference line of the plurality of first reference lines is less than one third of the regular spacing or less than one tenth of the regular spacing. While the spacing between the picture elements and the respective assigned first reference line can thus vary statistically and/or irregularly along the first direction of extent, the picture elements can be regularly distributed on average or can at least appear regularly distributed viewed over a large area. This can in particular increase the compatibility of the background display device with existing systems for generating a virtual background since, in the case of an arrangement that appears regular on average or over a large area, in particular any calculations for transforming a representation into the irregular two-dimensional arrangement of picture elements can be performed as simply as possible or can even be omitted without any recognizable distortions arising in the displayed representation of the virtual background.

In some embodiments, a distribution of the varying spacings between the plurality of first reference lines and the respective assigned picture elements can correspond to a normal distribution. The spacings between all the picture elements and the respective assigned reference line can in particular be normally distributed so that the picture elements can overall be statistically distributed along the first direction of extent with respect to a regular grid. Furthermore, the picture elements can be purely statistically distributed in the two-dimensional arrangement without having to follow a predetermined pattern.

In some embodiments, the normal distribution can be compatible with an expected value of zero. Furthermore, the normal distribution can in particular have an expected value of zero. For example, the normal distribution of the varying spacings having a confidence level of 1 σ, 2 σ or 3 σ can be compatible with an expected value of zero. Consequently, the picture elements can be distributed around the first reference lines such that the picture elements follow a regular grid along the first direction of extent on a large-area average. In turn, as high as possible a compatibility with existing systems can thereby be achieved.

In some embodiments, the two-dimensional arrangement can further be divisible by a plurality of second reference lines extending along the second direction of extent and arranged at a regular spacing from one another, wherein the regular spacing of the second reference lines can correspond to a mean value of spacings which picture elements adjacent along the first direction of extent have from one another. Each of the plurality of picture elements can further be assignable to a respective second reference line to which the picture element is adjacent with respect to the first direction of extent, wherein a spacing between each of the plurality of second reference lines and the respective assigned picture elements can vary irregularly along the second direction of extent.

As already explained above for first reference lines extending in parallel with one another and along the first direction of extent, the picture elements can thus be arranged statistically distributed and/or irregularly distributed with respect to a regular grid, in particular viewed along the second direction of extent. In such embodiments, the picture elements can therefore in particular not form a regular pattern along the first direction of extent.

Furthermore, in some embodiments, the adjacent picture elements can be arranged at respective irregularly varying spacings with respect to the plurality of first reference lines already mentioned above and with respect to the plurality of second reference lines so that the picture elements can be arranged statically distributed in two dimensions with respect to a regular grid, in particular an orthogonal grid.

In some embodiments, a number of the plurality of second reference lines can correspond to a number of picture elements that are arranged behind one another along the second direction of extent in the two-dimensional arrangement. A number of second reference lines aligned in parallel with one another can thus again be placed onto the two-dimensional arrangement of picture elements so that, in a regular arrangement of the picture elements, all the picture elements would lie on a respective second reference line. However, the spacings of the respective adjacent picture elements from all these second reference lines can vary irregularly to prevent the superposition of a pattern of the two-dimensional arrangement and a pattern of light-sensitive sensor elements of an image sensor.

In some embodiments, a mean spacing between the picture elements and the respective assigned second reference line of the plurality of second reference lines can be less than one third of the regular spacing of the second reference lines from one another or less than one tenth of the regular spacing of the second reference lines.

Furthermore, in some embodiments, a distribution of the varying spacings between the plurality of second reference lines and the respective assigned picture elements can correspond to a second normal distribution.

Furthermore, in some embodiments, the second normal distribution can be compatible with an expected value of zero. The second normal distribution can in particular have an expected value of zero.

As already explained above for embodiments with varying spacings of adjacent picture elements from a plurality of first reference lines, the picture elements can thus in particular be statistically distributed with respect to the plurality of second reference lines without following a pattern. Furthermore, the distribution can appear as a regular structure with respect to the plurality of second reference lines on a large-area average to facilitate a control by conventional systems.

In some embodiments, the background display device can have a control device that is connected to a memory in which the virtual background is provided as a representation in a regular grid. The control device can be configured to transform the provided virtual background into coordinates of the picture elements in the (irregular) two-dimensional arrangement.

Alternatively or additionally, the control device can also be configured to generate the virtual background and to image it onto a regular grid. For this purpose, the control device can in particular create a projection of a three-dimensional model of the virtual background onto two dimensions. The control device can then be configured to transform the imaged background, which is in this regard provided in a regular grid, into the coordinates of the picture elements in the (irregular) two-dimensional arrangement.

For example, the virtual background can be made available in a regular pixel matrix so that the virtual background can be directly displayed on a conventional background display device at which the picture elements are arranged in a correspondingly regular grid. Since, in the background display device disclosed herein, the picture elements can, however, be irregularly distributed with respect to such a grid at least along the first direction of extent, but in particular along both directions of extent, a direct display of the virtual background in the regular grid without considering the displacements of the picture elements of the background display device can result in a distorted representation of the virtual background. For instance on a direct association of pixels of the virtual background provided in the regular grid with respective picture elements, the pixels can in particular be displayed on the background display device at a position offset with respect to the regular grid so that the representation of the virtual background by the background display device can differ from the virtual background provided. Due to a corresponding transformation, in which it can, for example, be determined which pixel of the virtual background provided in the regular grid is closest to a respective picture element in order to display this closest pixel at the respective picture element, the virtual background provided in the regular grid can, in contrast, be represented as detailed and as undistorted as possible at the irregular two-dimensional arrangement of the picture elements.

In some embodiments, the coordinates of the plurality of picture elements can be stored in the memory and/or can be writable into the memory. For example, the memory can be part of the panel so that information about the two-dimensional arrangement and in particular the coordinates of the picture elements can be writable into the memory and provided stored in the memory by the manufacturer. This can in particular be provided for standardized panels that can always have the same but irregular arrangement of picture elements. However, provision can also be made that an irregular arrangement of picture elements or their coordinates can be written into the memory by a user.

In general, the memory in which the coordinates are made available can be the same physical element in which the background is also provided in a regular grid, or physically separate units can be provided to be able to provide the background in the regular grid, on the one hand, and the coordinates of the plurality of picture elements, on the other hand, wherein the control device can access these separate units. The memory or the memories can in particular be configured as non-volatile memories and/or semiconductor memories.

Since the coordinates of the plurality of picture elements are stored in the memory, the control device can draw both on the coordinates of the picture elements and on the regular grid in which the virtual background is provided in order to perform the required transformation. For this purpose, the virtual background can also be provided with respective coordinates of pixels of the regular grid in the memory.

In some embodiments, the control device can be configured to determine a respective color value and/or a respective brightness value for the picture elements via the transformation based on the virtual background provided in the regular grid. For example, the control device can determine a position of a respective picture element on a projection onto the virtual background provided in the regular grid in order to assign a color value and/or a brightness value of a pixel adjacent to this position in the regular grid to the picture element. However, the control device can also be configured to determine the color values and/or brightness values for the picture elements by interpolation methods in which the color values and/or brightness values of a plurality of pixels adjacent to the determined position are considered. The control device can also be configured to control the picture elements to display the determined color values and/or brightness values.

In some embodiments, the control device can be configured to transform the provided virtual background into the two-dimensional arrangement of the picture elements by a next neighbor method, a bilinear interpolation and/or a bicubic interpolation.

For example, the control device can be configured to determine a position of a respective picture element in the regular grid of the virtual background. By using a next neighbor method, the control device can then determine which pixel in the regular grid of the virtual background the position of the picture element is closest to in order to be able to display this closest pixel, in particular its color and/or brightness, by the picture element.

When a bilinear interpolation is used, the control device can, in contrast, be configured to linearly interpolate between four pixels, which are adjacent to the determined position of a picture element, in the regular grid of the virtual background to be able to display a thereby determined color value and/or brightness value by the picture element. In a bicubic interpolation, the values of 4×4 adjacent pixels can be used to determine how the respective picture element is to be controlled. The respective method for the transformation can generally also be selectable so that the method can, for example, be selectable in dependence on the available time and/or the available computing power and/or existing accuracy requirements for the representation of the virtual background.

Furthermore, in some embodiments, the virtual background can be provided as a model in the memory. As already explained, the control device can in this case in particular be configured to create the virtual background based on the model and/or to image the virtual background onto a two-dimensional regular grid.

For example, the control device can comprise a game engine for generating the virtual background. For this purpose, the control device can be connected to a memory in which one or more databases can be stored in which the virtual background can be stored as one or more models. The control device can further be configured to create the virtual background in dependence on a position and/or a viewing direction of the camera by using the game engine in that—similarly to as in a computer game in dependence on the position of the player—different contents are read out from the databases and the virtual background is created in dependence on the camera position.

In some embodiments, the control device can further be configured to control the picture elements individually and/or in groups of adjacent picture elements to display the representation of the virtual background. The control device can thus in particular be configured to control the picture elements directly to display the transformed virtual background.

The control device can further, for example, be configured as a microprocessor and/or a CPU (central processing unit). Furthermore, the control device can comprise a plurality of microprocessors and/or CPUs communicating with one another, wherein a transformation of the virtual background provided in the regular grid into the irregular arrangement of the picture elements can, for example, be performed by one of the microprocessors, while another microprocessor is provided for controlling the picture elements.

In some embodiments, the background display device can furthermore comprise a single continuous panel that is relatively large with respect to, for example, an actor and that can be planar or arched.

Alternatively thereto, in some embodiments, the background display device can, however, also comprise a plurality of mutually adjoining panels. Each of the plurality of panels and/or the one panel can be formed as rectangular and without edges. Furthermore, the plurality of panels can be arranged in a two-dimensional matrix. In such embodiments, the representation of the virtual background can be displayed by the plurality of panels, wherein each panel can display a respective section of the representation. The panels can furthermore in particular be formed as square.

In some embodiments, the (plurality of) panels can be formed identically to one another with respect to their two-dimensional arrangement of actively illuminating picture elements. The actively illuminating picture elements can in particular be irregularly arranged at each of the panels or can be arranged statistically distributed with respect to a regular grid, wherein the panels can, however, be formed identically to one another. In this regard, the panels can be manufactured in a standardized manner so that in particular transformations of a regular grid into the irregular two-dimensional arrangement of the picture elements can take place in a standardized manner and do not have to be individually determined for each panel. The panels can in particular be configured with a control device that enables such a transformation so that the panels can be connected without problem to conventional devices that can, for example, provide a virtual background in a regular grid.

The invention also relates to a background display device for a virtual image recording studio that is configured to display, behind a real subject, a representation of a virtual background for a camera recording, wherein the background display device comprises at least one panel having a plurality of actively illuminating picture elements that form a two-dimensional arrangement that generally extends along a first direction of extent and a second direction of extent oriented perpendicular thereto, wherein the two-dimensional arrangement of actively illuminating picture elements forms irregular deviations along the first direction of extent and/or along the second direction of extent relative to an orthogonal grid. The features and embodiments explained above can be provided in such a background display device.

The invention further relates to a method of displaying a representation of a virtual background by a background display device, in particular a background display device in accordance with any one of the embodiments explained above, for a recording by a camera in a virtual image recording studio, wherein the background display device comprises at least one panel having a plurality of actively illuminating picture elements that form an irregular two-dimensional arrangement, wherein the virtual background is provided as a representation in a regular grid, and wherein the virtual background is transformed into coordinates of the picture elements in the irregular two-dimensional arrangement for the display on the background display device. The features and embodiments explained above can be provided in such a method.

The invention will be explained in the following purely by way of example with reference to embodiments and to the drawings.

Figure 2:
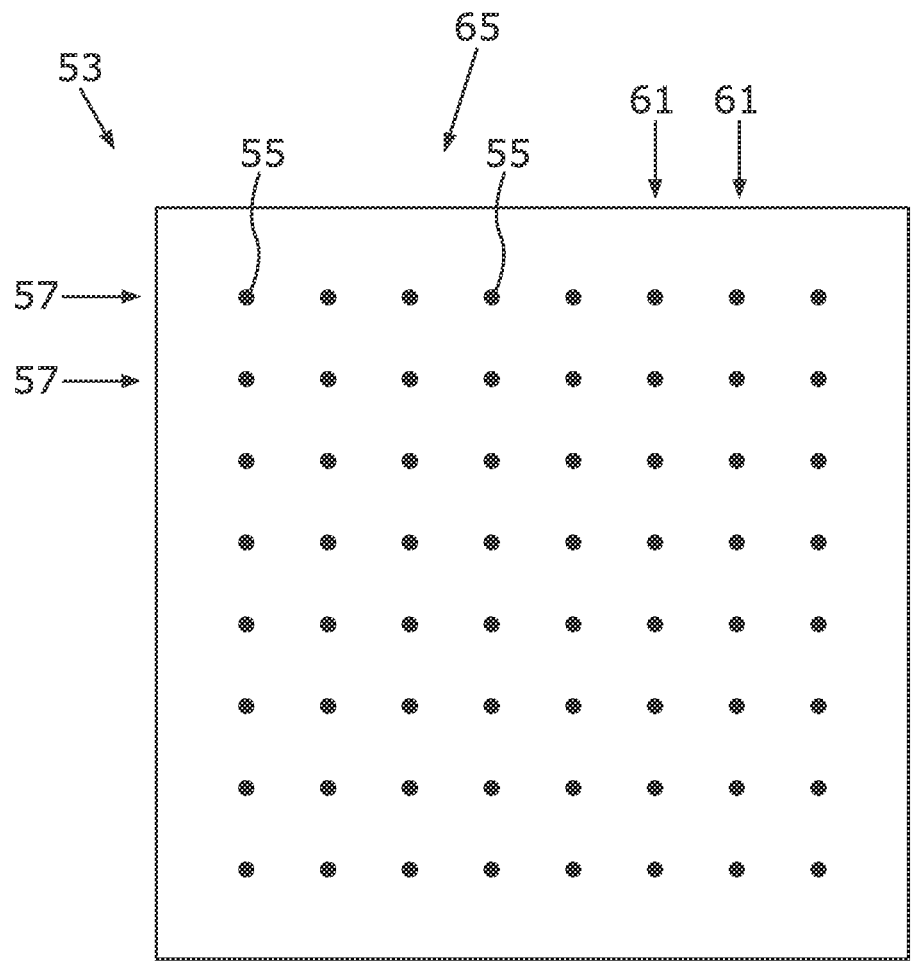
Figure 3A:
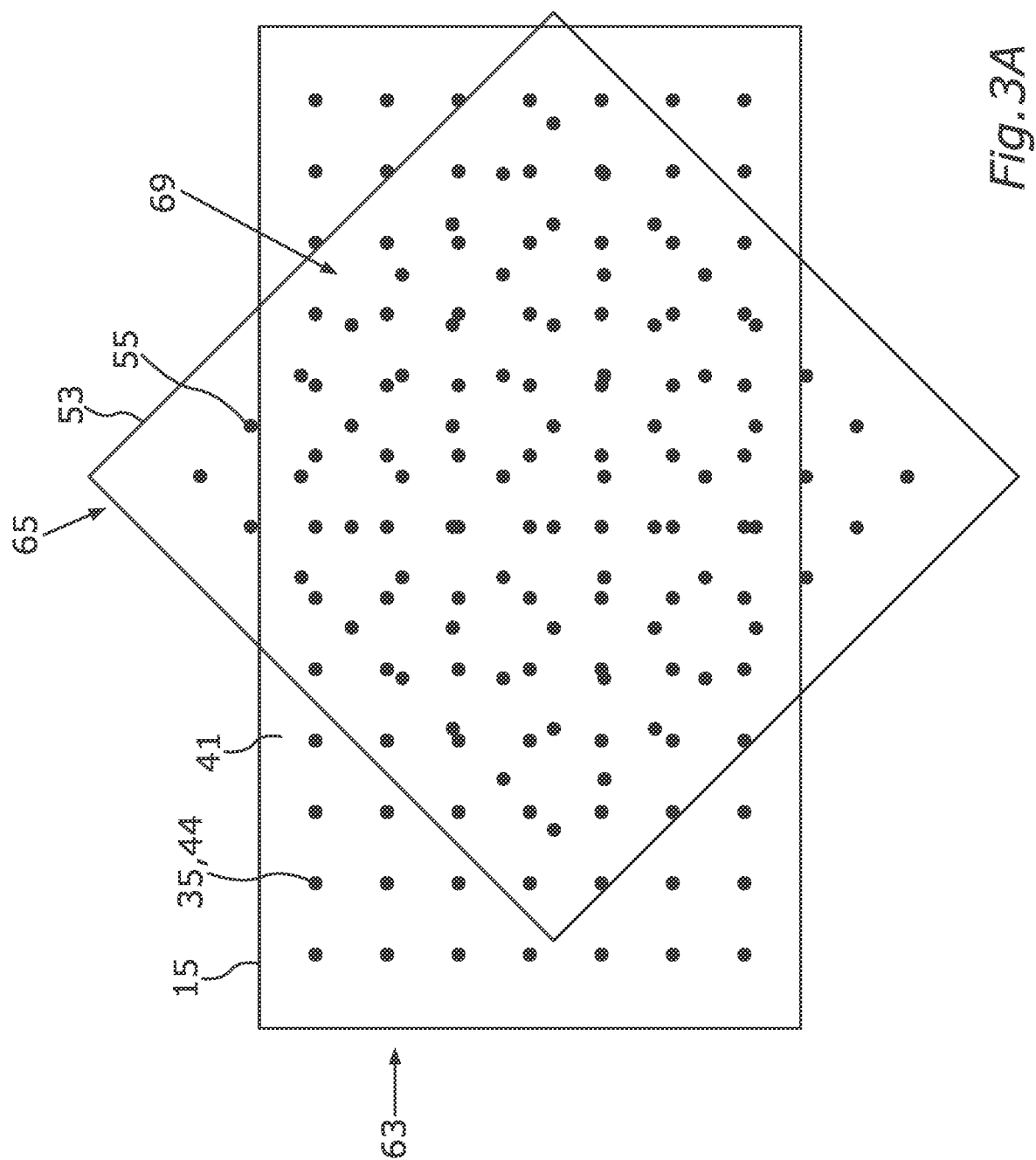
Figure 3B:
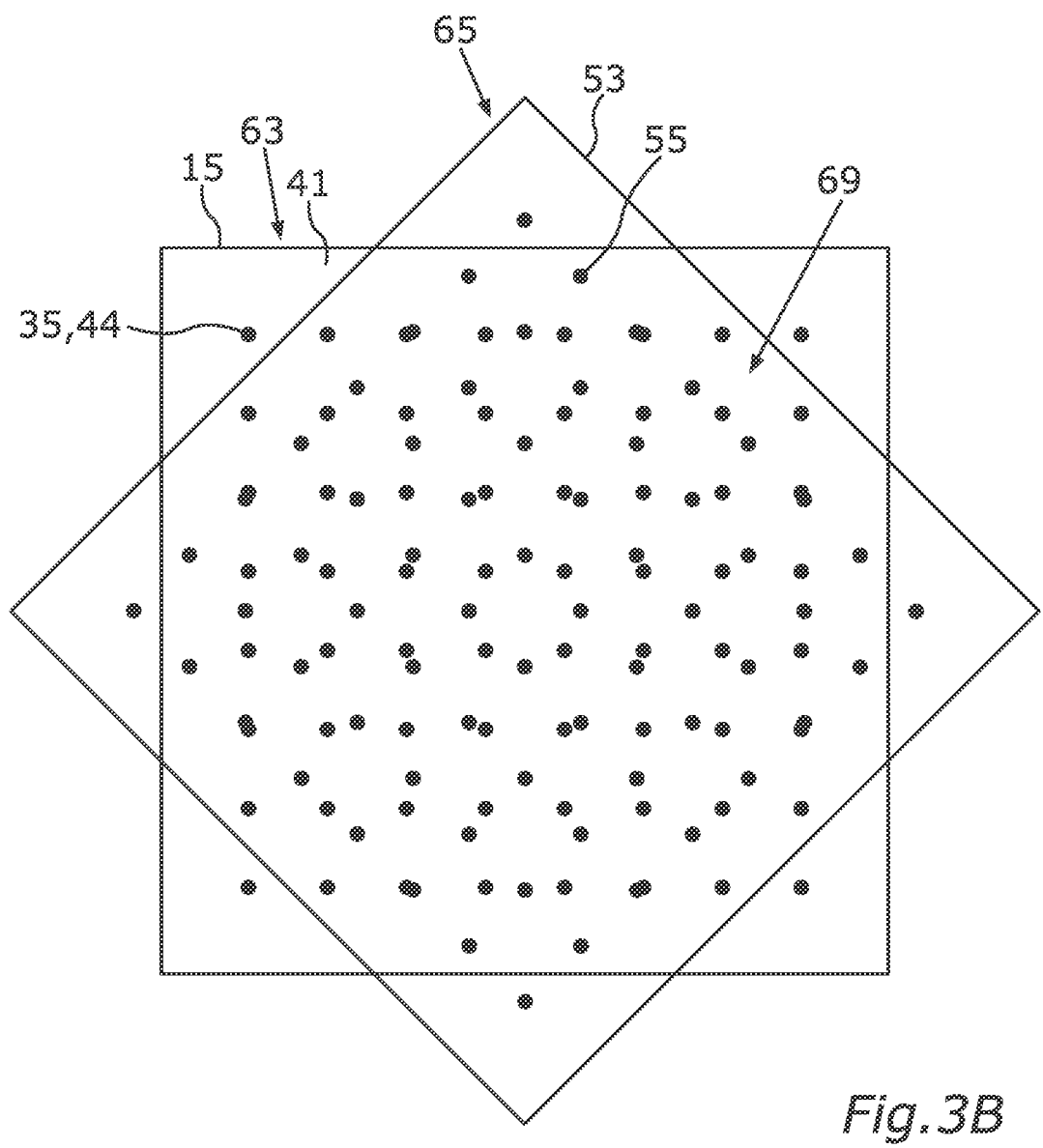
Figure 4:
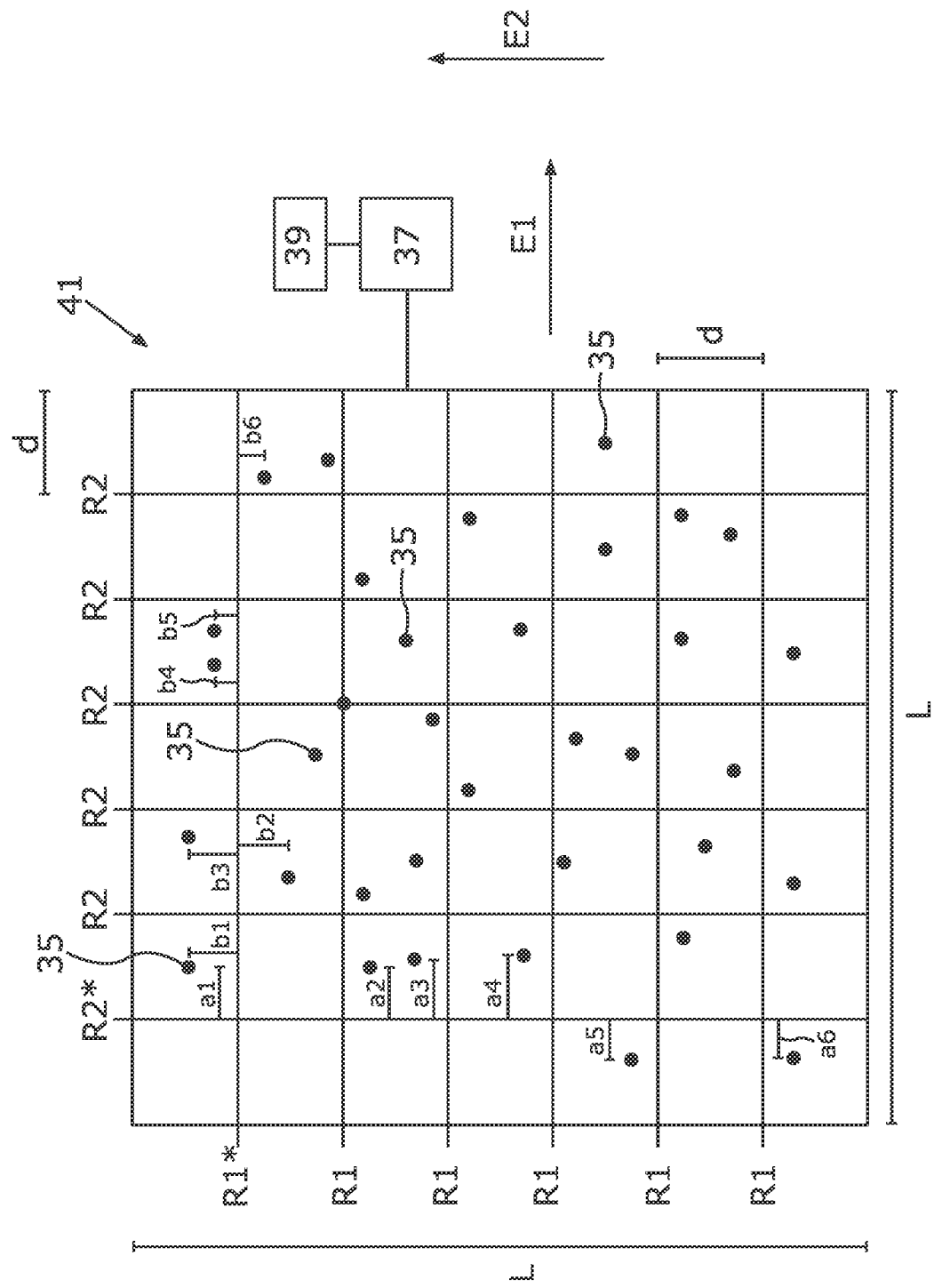
Figure 5:
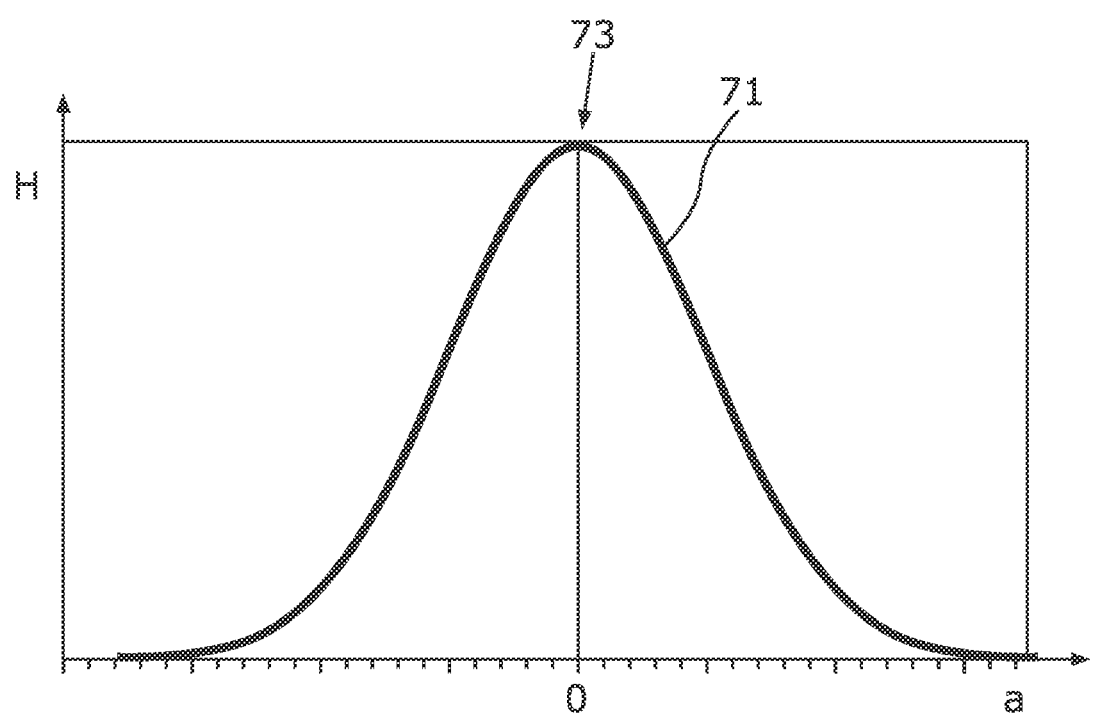
Figure 6:
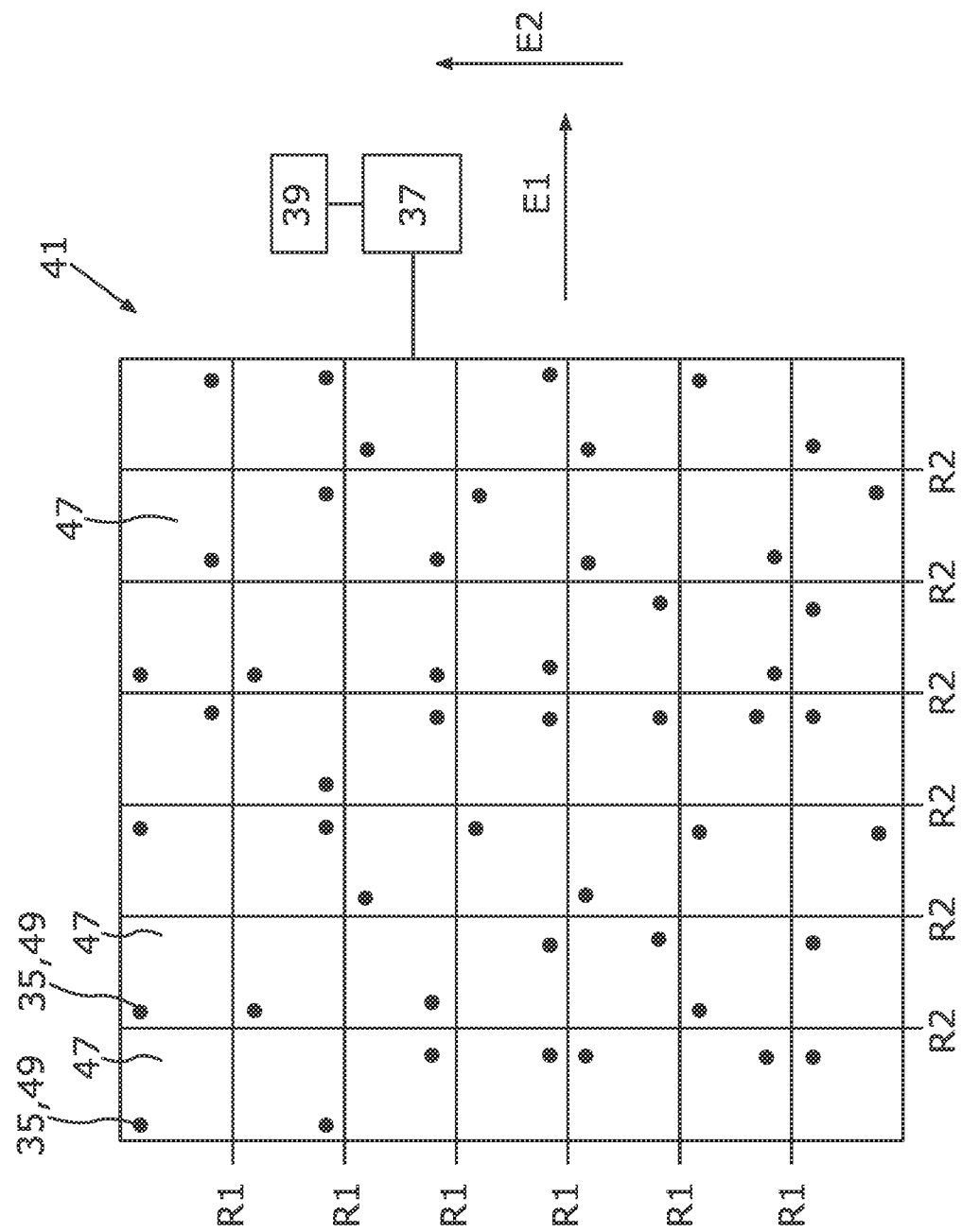
Figure 7:
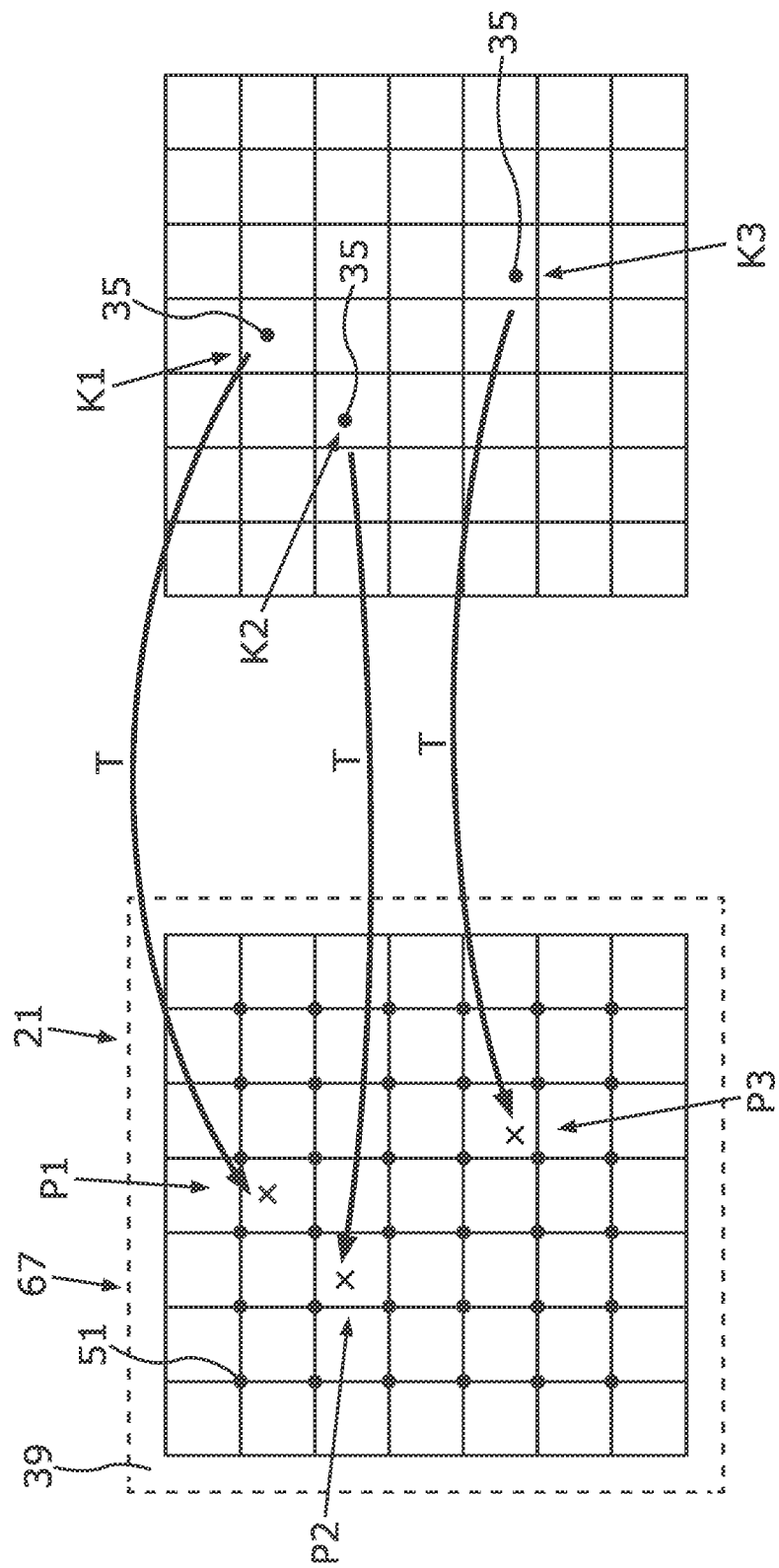
Figure 8:
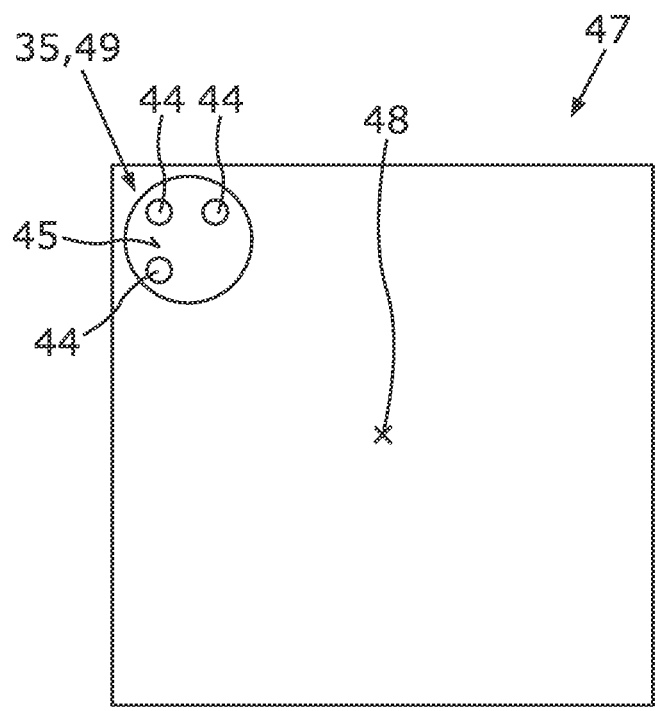

There are shown:

FIG. 1 a schematic representation of a recording system for an image recording studio with a background display device for displaying a representation of a virtual background and with a camera;

FIG. 2 a schematic representation of an image sensor of the camera;

FIGS. 3A and 3B a respective schematic representation for illustrating patterns arising in an image of the background display device;

FIG. 4 a schematic representation of a panel of the background display device in which a plurality of picture elements are arranged statistically distributed with respect to a regular grid;

FIG. 5 a distribution of spacings of the picture elements from respective reference lines of the regular grid;

FIG. 6 a schematic representation of a panel of the background display device that has a plurality of picture element units having eccentric light-emitting areal regions whose orientation varies;

FIG. 7 a schematic representation for illustrating a transformation of a virtual background provided in a regular grid into an irregular arrangement of picture elements of the background display device; and FIG. 8 a schematic representation of a picture element unit that has a light-emitting diode unit with a plurality of light-emitting diodes as an eccentric light-emitting areal region.

FIG. 1 schematically shows a virtual image recording studio 13, in which a scene, in particular in the form of a moving image recording and/or a photo recording, can be recorded by an associated camera 23. The camera 23 can, for example, be designed as a moving image camera in order to carry out moving images recordings that can be stored as a series of images generated by the camera 23.

For this purpose, the camera 23 has a lens 59 that can in particular be designed as an interchangeable lens and that can selectively be connected to a housing of the camera 23. As a result, a respective lens 59, optimally adjusted to the environment in the image recording studio 13, can always be used in order to be able to generate the best possible recordings. An image sensor 53 comprising a plurality of light-sensitive sensor elements 55 can in particular be arranged in the housing of the camera 23, onto which sensor elements light, which enters via a diaphragm aperture of a diaphragm, can be guided by a lens system or at least one lens to generate an image (cf. FIG. 2).

Furthermore, a background display system 11 having a background display device 15 is arranged in the image recording studio 13 and, together with the camera 23, forms a recording system 10. The background display device 15 comprises an active illumination apparatus 31 configured as an LED wall 33 and is configured to display a representation 19 of a virtual background 21 for a recording by the camera 23. For this purpose, the illumination apparatus 31 or the LED wall 33 has a plurality of actively illuminating picture elements 35 that are arranged next to one another in a two-dimensional arrangement. For example, the picture elements 35 can be configured as individually controllable light-emitting diodes 44 or as individually controllable light-emitting diode units 45, wherein each of such a light-emitting diode unit 45 can comprise a plurality of light-emitting diodes 44, in particular three light-emitting diodes 44 (cf. also FIG. 8). Provision can in particular be made that the picture elements 45 are configured as light-emitting diode units 45 having three respective light-emitting diodes 44, wherein one of the three light-emitting diodes 44 can emit red light, one light-emitting diode 44 can emit green light and one light-emitting diode 44 can emit blue light. The light-emitting diode unit 45 can furthermore comprise a color mixer to be able to set a respective color and/or brightness emitted by the picture element 35 by a respective individual control of the light-emitting diodes 44 of a light-emitting diode unit 45. The light-emitting diodes 44 can, for example, be configured as LEDs or as organic light-emitting diodes 44 or OLEDs. Background display devices for displaying a representation of a virtual background that generate the representation by a rear projection can generally also be used in the image recording studio 13.

The background display device 15 further comprises a plurality of panels 41. A respective plurality of the actively illuminating picture elements 35 are arranged at each panel 41 of the plurality of panels 41 so that a section of the representation 19 of the virtual background 21 can be displayed at each of the panels 41. The panels 41 are in particular rectangular and/or square and formed without edges so that the representation 19 of the virtual background 21 can also be displayed without visible interruptions at the transitions between panels 41. The panels 41 are further arranged in a two-dimensional matrix to form the background display device 15.

The representation 19 of the virtual background 21 reflects here, for example, a three-dimensional scene 43 with objects 91, 92, 93 and 94, three trees and a path, which can be generated by appropriate control of the picture elements 35, in particular, by an appropriate setting of their respective color and brightness. The three-dimensional scene 43 is projected onto the essentially two-dimensional arrangement of the picture elements 35 of the illumination apparatus 31, wherein, in particular, the objects 91, 92 and 93 appear at a different distance to the illumination apparatus 31 or the background display device 11, in order to recreate the three-dimensionality of a real background corresponding to the virtual background 21.

In particular, the representation 19 of the virtual background 21 by way of the background display device 15, serves to generate a background for a recording of a real subject 17, for example an actor, in front of which a recording can be made or a film scene can be played. As a result, basically any kind of landscapes, spaces or environments can be created in the image recording studio 13, in front of, or, in which, a scene, for example, for a movie, is to be filmed. It is furthermore possible, by a time-variable control of the picture elements 35, to show movements in the virtual background 21, for example, a passing car, to which the actor 17 can react in an easy and improved manner compared to a scene in front of a green screen.

The background display device 15 extends here essentially in the vertical direction so that the actor 17 can move in front of the virtual background 21. However, in order to be able to depict the virtual background 21 more extensively, the background display device 15 can also extend around or above the actor 17, wherein the background display device 15 above the actor 17 can exhibit, in particular, a horizontal orientation. In order to be able to surround the actor 17 or to generate a transition from the shown vertical orientation to a horizontal orientation, the background display device 15 or the illumination apparatus 31 or the LED wall 33 can also be at least sectionally arched or curved.

In addition to representing the virtual background 21, the background display device 15 can also serve to illuminate the real subject 17 and thereby facilitate, for example, a further studio lighting for the image recording studio 13. Furthermore, by illuminating the real subject 17 by the background display device 15, the interaction of the real subject 17 or the actor 17 with light sources present in the virtual background 21, for example, lanterns or lamps, can be improved in that the real subject 17 casts a shadow which corresponds to the light conditions visible in an image generated by the camera 23.

To be able to generate the representation 19 of the virtual background 21 and to control the picture elements 35 to display the representation, the background display device 15 has a control device 37 that is connected to a memory 39. A model of the virtual background 21 can in particular be stored in the memory 39 so that the control device can generate the virtual background 21 based on the model. Furthermore, the control device 37 can be configured to project the virtual background 21 onto the background display device 15 and in particular the two-dimensional arrangement of the picture elements 35.

In the background display device 15 illustrated by means of FIG. 1, the picture elements 35 of each of the panels 41 and all the picture elements 35 of the background display device 15 form a regular, orthogonal grid 63, wherein the picture elements 35 are arranged in a straight line behind one another along a first direction of extent E1 and along a second direction of extent E2. As already explained, the camera 23 can in particular have an image sensor 53 whose light-sensitive sensor elements 55 are arranged in a plurality of rows 57 and in a plurality of columns 61 so that the light-sensitive sensor elements 55 are also arranged in a regular and orthogonal grid 65 (cf. FIG. 2).

Since both the picture elements 35 of the background display device 15 are thus arranged in the regular grid 63 and the light-sensitive sensor elements 55 of the image sensor 53 are arranged in the regular grid 65, on a recording of the background display device 15 by the camera 23, interference and cancellation effects can occur due to which geometric patterns can arise in an image 69 of the background display device 15 generated by the camera 23 that are not included in the representation 19 of the virtual background 21 or in the virtual background 21. This is illustrated by means of FIGS. 3A and 3B, wherein a recording situation is shown in which the camera 23 and thus the image sensor 53 are rotated with respect to the background display device 15. Due to the superposition of the grids 63 and 65, recurring geometric patterns can appear in the image 69 generated by the camera 23 or during a display of this image 69, due to which recurring geometric patterns the image 69 can be completely unusable as a still image recording and/or as a sequence of a moving image recording. While the equipping of a virtual image recording studio 13 with such a background display device 15 can thus facilitate the acting and the recording of scenes in that the representation 19 of the virtual background 21 can be directly perceived and imaged by the camera 23, these patterns forming in the image 69 may stand in the way of using such a background display device 15.

However, to be able to prevent the formation of such patterns in an image 69 by the camera 23 when a background display device 15 is used, the background display device can comprise a panel 41 schematically illustrated by means of FIG. 4 or a plurality of such panels. This panel 41 also has a plurality of actively illuminating picture elements 35 that form a two-dimensional arrangement extending along a first direction of extent E1 and a second direction of extent E2 oriented perpendicular thereto. Unlike in conventional background display devices 15 or conventional panels 41, these picture elements 35 are, however, not arranged in a regular and orthogonal grid 63, but the picture elements 35 are statistically distributed with respect to such a grid 63.

In FIG. 4, to illustrate this distribution of the picture elements 35, a regular grid is shown that comprises a plurality of first reference lines R1 extending rectilinearly along the first direction of extent E1 and a plurality of second reference lines R2 extending rectilinearly along the second direction of extent E2. Both the first reference lines R1 and the second reference lines R2 have a regular spacing d from one another. The regular spacing d of the first reference lines R1 from one another corresponds to a mean value of spacings which picture elements 35 adjacent to one another along the second direction of extent E2 have from one another, and the regular spacing d of the second reference lines R2 from one another corresponds to a mean value of spacings which picture elements 35 adjacent to one another along the first direction of extent E1 have from one another. Furthermore, the number of the first reference lines R1 corresponds to a number of picture elements 35 arranged behind one another along the second direction of extent E2. A number of the second reference lines R2 also corresponds to a number of picture elements 35 arranged behind one another along the first direction of extent E1. In this regard, the first reference lines R1 and the second reference lines R2 form a regular grid, wherein, in a conventional regular arrangement, the picture elements 35 could be arranged at the respective points of intersection of the first reference lines R1 and the second reference lines R2.

In contrast, in the panel 41 illustrated by means of FIG. 4, the picture elements 35—at least not all the picture elements 35—are not arranged at such points of intersection of the reference lines R1 and R2, but are statistically distributed with respect to the reference lines R1 and R2. Therefore, a respective spacing b1, b2, b3, b4, b5 and b6, measured along the second direction of extent E2, of the picture elements 35, which are adjacent to the first reference line R1* shown above in FIG. 4, from the first reference line R1* in particular varies irregularly along the first direction of extent E1. The picture elements 35, which would be intersected by the first reference line R1* in a conventional arrangement in a regular grid, are thus statistically distributed around this first reference line R1*. Furthermore, it can be seen from FIG. 4 that spacings of respective adjacent picture elements 35 from each first reference line R1 vary irregularly along the first direction of extent E1.

Since the spacing of the picture elements 35 from the first reference line R1* varies irregularly along the first direction of extent E1, the spacings b1, b2, b3, b4, b5 and b6 in particular do not form a repeating pattern. For example, provision can be made that the spacings b1, b2, b3, b4, b5 and b6 of the picture elements 35 from the first reference line R1* vary irregularly over the entire extent of the panel 41 and do not form a repeating pattern, wherein it may, however, be sufficient if the spacings b1, b2, b3, b4, b5 and b6 of the picture elements 35 from the first reference line R1* vary irregularly over a reference path L, which can, for example, amount to 5 cm and/or can comprise ten picture elements 35, and do not form a repeating pattern.

Similarly, it can be seen from FIG. 4 that respective spacings a1, a2, a3, a4, a5 and a6 of picture elements 35 adjacent to a second reference line R2* shown the furthest to the left in FIG. 4 from the second reference line R2* vary irregularly along the second direction of extent E2. In the panel 41 shown, the spacings between all the first reference lines R1 and respective adjacent picture elements 35, which can be assigned to a respective reference line R1 in this regard, and spacings between all the reference lines R2 and respective adjacent picture elements 35, which can be assigned to a respective second reference line R2 in this regard, in particular vary statistically. Overall, the arrangement of the picture elements 35 thus varies statistically in two dimensions with respect to a regular grid.

Since the picture elements 35 vary statistically with respect to a regular arrangement and in particular with respect to the conventional regular orthogonal grid 63, it can be prevented that, on an imaging of the background display device 35 or of the panel 41 by the camera 23, geometric patterns similar to the patterns illustrated in FIGS. 3A and 3B arise in the generated image 69 due to a superposition of the arrangement of the picture elements 35 with the regular grid 65 of the image sensor 53. Rather, by avoiding recurring patterns, at least along a sufficiently long reference path L, it can be avoided in the arrangement of the picture elements 35 that recognizable patterns arise in the image 69 so that the images of the background display device 15 created by the camera 23 can be reliably used.

As is illustrated in FIG. 5, a frequency H of the spacings a of the picture elements 35 from the first reference lines R1 and/or from the second reference lines R2 can in particular be normally distributed. Furthermore, the normal distribution 71 can in particular be compatible with an expected value 73 of zero, wherein the normal distribution 71 illustrated in FIG. 5 in particular has an expected value 73 of zero.

The picture elements 35 can thus in particular be statistically distributed around the first reference lines R1 and the second reference lines R2 such that the arrangement of the picture elements 35 gives the appearance of a regular arrangement on a large-area average. Due to such a distribution, the compatibility with conventional systems that use a strictly regular arrangement of picture elements 35 can in particular be simplified to be able to retrofit existing systems with such panels 41, for example. Furthermore, a mean spacing between the picture elements 35 and the first reference lines R1 and/or the second reference lines R2 can be less than one third and/or less than one tenth of the regular spacing d of the first reference lines R1 from one another and of the second reference lines R2 from one another so that the picture elements 35 can be distributed only slightly, but sufficiently to prevent patterns from appearing in the image 69, with respect to a regular grid. The required distribution can, for example, be determined by simulations.

However, to increase the compatibility of the panel 41 with existing systems even further, the panel 41 has a control device 37 that is connected to a memory 39. As already explained, in this memory 39, a model of the virtual background 21 can in particular be stored based on which the control device 37 can generate the virtual background 21 and can appropriately control the picture elements 35 to display the representation 19 of the virtual background 21. Furthermore, the control device 37 of the panel 41 illustrated by means of FIG. 4 is configured to transform a virtual background 21 provided in the memory 39 in a regular grid 67 into coordinates K1, K2 and K3 of the picture elements 35 and/or into the irregular two-dimensional arrangement of the picture elements 35. The control device 37 can generally also be configured to first project a virtual background 21, for example a three-dimensional virtual background 21, stored in the memory 39 onto the regular grid 67 in order to transform the virtual background 21 then available in the regular grid 67 into the coordinates K1, K2 and K3 of the picture elements 35 of the panel 41.

To perform such a transformation T, the coordinates K1, K2 and K3 of the picture elements 35 can in particular also be stored in the memory 39. As FIG. 7 illustrates, the control device 37 can be configured to convert the coordinates K1, K2 and K3 into respective positions P1, P2 and P3 in the regular grid 67 of the provided virtual background in order thereupon to determine a respective color value and/or brightness value associated with the positions P1, P2 and P3.

For example, the control device 37 can determine such color values and/or brightness values by a next neighbor method in that the control device 37 determines a respective pixel 51 of the regular grid 67 closest to the positions P1, P2 and P3 and assigns the color value and/or brightness value of the corresponding pixel 51 to the positions P1, P2 and P3. For this purpose, the coordinates of the pixels 51 of the virtual background 21 in the regular grid 67 can in particular also be stored in the memory 39. However, the control device 37 can also be configured to determine the values for the positions P1, P2 and P3 by a bilinear interpolation by using four respective pixels 51 of the regular grid 67 that surround the positions P1, P2 and P3 and by averaging their color values and/or brightness values to determine values associated with the respective positions P1, P2 and P3. Furthermore, the control device 37 can also be configured to perform a bicubic interpolation, wherein 4×4 adjacent pixels 51 are used for each of the positions P1, P2 and P3.

While the control device 37 can thus be configured to perform such a transformation T and to determine color values and/or brightness values associated with the positions P1, P2 and P3, the control device 37 can also be configured to control the picture elements 35 having the coordinates K1, K2 and K3 to display the color values and/or brightness values associated with the positions P1, P2 and P3. It can hereby be achieved that, despite the irregular arrangement of the picture elements 35, no distortion of the representation 19 of the virtual background 21 takes place and since the panel 41 can be directly equipped with such a control device 37, a connection to existing systems that provide the virtual background 21 in the regular grid 67 can take place without problem.

FIG. 6 schematically shows a further embodiment of a panel 41 in which a plurality of picture elements 35 are statistically distributed with respect to a regular grid. The panel 41 has a plurality of picture element units 47 that are formed as square by way of example here (cf. also FIG. 8). Hexagonal or octagonal designs of such picture element units 47 can generally also be provided. The picture element units 47 furthermore form a regular structure or a regular grid.

Each of the picture element units 47 has an eccentric light-emitting areal region 49 that forms the picture element 35 and that is arranged eccentrically with respect to a geometric center 48 of the picture element unit 47 (cf. FIG. 8). The statistical distribution of the picture elements 35 with respect to the regular grid formed by the picture element units 47 can be achieved in that the orientation of the picture element units 47 varies along the first direction of extent E1 and the second direction of extent E2 so that the eccentric light-emitting areal regions 49 can be arranged with an irregularly varying spacing of connecting lines between the picture element units 47 or reference lines R1 and R2. For this purpose, the picture element units 47 can in particular be arranged rotated with respect to one another. Furthermore, the picture element units 47 can be mechanically coupled to one another and/or to a carrier to form the panel 41 and there can be a technical signal connection between the picture element units 47 to be able to display the representation 19 of the virtual background 21.

REFERENCE NUMERAL LIST 10 recording system
11 background display system
13 image recording studio
15 background display device
17 real subject, actor
19 representation
21 virtual background
23 camera
31 illumination apparatus
33 LED wall
35 picture element
37 control device
39 memory
41 panel
43 three-dimensional scene
35 light-emitting diode
45 light-emitting diode unit
47 picture element unit
48 geometric center
49 eccentric light-emitting areal region
51 pixel
53 image sensor
55 light-sensitive sensor element
57 row
59 camera lens, interchangeable lens
61 column
63 regular grid
65 regular grid
67 regular grid
69 image
71 normal distribution
73 expected value
91 first object
92 second object
93 third object
94 fourth object
E1 first direction of extent
E2 second direction of extent
H frequency
K1, K2, K3 coordinate
L reference path
P1, P2, P3 position
R1, R1* first reference line
R2, R2* second reference line
T transformation
a spacing
a1-a6 spacing
b1-b6 spacing
d regular spacing

The invention claimed is:

1. A background display device for a virtual image recording studio that is configured to display, behind a real subject, a representation of a virtual background for a camera recording,
    wherein the background display device comprises at least one panel having a plurality of actively illuminating picture elements that form a two-dimensional arrangement that extends along a first direction of extent and a second direction of extent oriented perpendicular thereto,
    wherein a respective spacing, measured along the second direction of extent, of the picture elements from a first reference line that extends rectilinearly along the first direction of extent varies irregularly along the first direction of extent,
    wherein the panel has a number of separate picture element units that corresponds to the plurality of picture elements, said separate picture element units forming a regular arrangement, wherein each picture element unit has an eccentric light-emitting areal region that corresponds to a respective picture element, but that is eccentrically arranged with respect to a geometric center of the picture element unit, wherein the orientation of the respective eccentric light-emitting areal region varies along the regular arrangement of picture element units.

2. A background display device in accordance with claim 1,
    wherein the background display device is configured as an LED wall and the picture elements are configured as light-emitting diodes or light-emitting diode units.

3. A background display device in accordance with claim 1,
    wherein the respective spacing of the picture elements from the first reference line varies irregularly along a reference path along the first direction of extent, the reference path at least one of amounting to at least 5 cm or comprising at least 20 picture elements; or
    wherein the respective spacing of the picture elements from the first reference line varies irregularly over the total extent of the panel along the first direction of extent.

4. A background display device in accordance with claim 1,
    wherein the spacings of the picture elements from the first reference line are normally distributed.

5. A background display device in accordance with claim 1,
    wherein the spacings of the picture elements from the first reference line do not form a repeating pattern along the first direction of extent.

6. A background display device in accordance with claim 1,
    wherein a respective spacing, measured along the first direction of extent, of the picture elements from a second reference line that extends rectilinearly along the second direction of extent varies irregularly along the second direction of extent.

7. A background display device in accordance with claim 1,
wherein the two-dimensional arrangement can be divided by a plurality of first reference lines extending along the first direction of extent and arranged at a regular spacing from one another,
wherein the regular spacing corresponds to a mean value of spacings which picture elements adjacent along the second direction of extent have from one another,
wherein each of the plurality of picture elements can be assigned to a respective first reference line to which the picture element is adjacent with respect to the second direction of extent,
wherein a spacing between each of the plurality of first reference lines and the respective assigned picture elements varies irregularly along the first direction of extent.

8. A background display device in accordance with claim 7,
wherein a mean spacing between the picture elements and the respective assigned first reference line of the plurality of first reference lines is less than one third of the regular spacing or less than one tenth of the regular spacing.

9. A background display device in accordance with claim 7,
wherein a distribution of the varying spacings between the plurality of first reference lines and the respective assigned picture elements corresponds to a normal distribution.

10. A background display device in accordance with claim 9,
wherein the normal distribution is at least compatible with an expected value of zero or has an expected value of zero.

11. A background display device in accordance with claim 1,
wherein the picture elements are regularly distributed on average.

12. A background display device in accordance with claim 1,
wherein the two-dimensional arrangement can be divided by a plurality of second reference lines extending along the second direction of extent and arranged at a regular spacing from one another,
wherein the regular spacing of the second reference lines corresponds to a mean value of spacings which picture elements adjacent along the first direction of extent have from one another,
wherein each of the plurality of picture elements can be assigned to a respective second reference line to which the picture element is adjacent with respect to the first direction of extent,
wherein a spacing between each of the plurality of second reference lines and the respective assigned picture elements varies irregularly along the second direction of extent.

13. A background display device in accordance with claim 12,
wherein a distribution of the picture elements appears as a regular structure with respect to the plurality of second reference lines on a large-area average.

14. A background display device in accordance with claim 1,
wherein the background display device has a control device,
wherein the control device is connected to a memory in which the virtual background is stored as a representation in a regular grid, wherein the control device is configured to transform the provided virtual background into coordinates of the picture elements in the two-dimensional arrangement.

15. A background display device in accordance with claim 14,
wherein the coordinates of the plurality of picture elements are stored in the memory or can be written into the memory.

16. A background display device in accordance with claim 14,
wherein the control device is configured to determine at least one of a respective color value or a respective brightness value for the picture elements via the transformation based on the virtual background provided in the regular grid.

17. A background display device in accordance with claim 14,
wherein the control device is configured to transform the provided virtual background into the coordinates of the picture elements by at least one of a next neighbor method, a bilinear interpolation or a bicubic interpolation.

18. A background display device in accordance with claim 1,
wherein the background display device comprises a plurality of mutually adjoining panels, wherein each panel is formed as rectangular and without edges, wherein the panels are arranged in a two-dimensional matrix, and
wherein the panels are formed identically to one another with respect to their two-dimensional arrangement of actively illuminating picture elements.

19. A method of displaying a representation of a virtual background by a background display device in accordance with claim 1 for a recording by a camera in a virtual image recording studio,
wherein the background display device comprises at least one panel having a plurality of actively illuminating picture elements that form an irregular two-dimensional arrangement,
wherein the virtual background is provided as a representation in a regular grid and is transformed into coordinates of the picture elements in the irregular two-dimensional arrangement for the display on the background display device.

* * * * *